Patented June 5, 1951

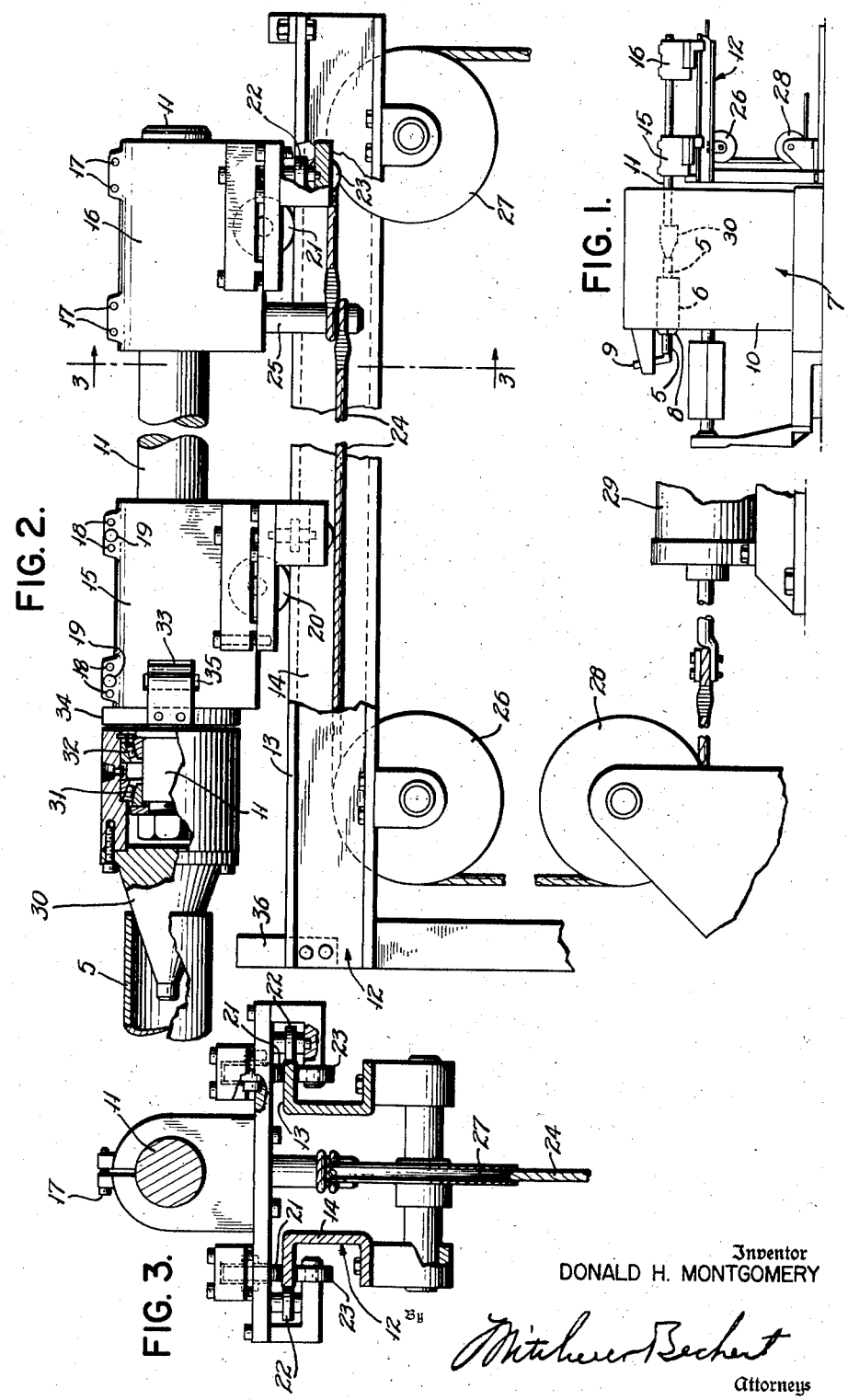

2,555,753

UNITED STATES PATENT OFFICE 2,555,753

EXTENDIBLE STOCK FEED MECHANISM

Donald H. Montgomery, West Hartford, Conn., assignor to The New Britain Machine Company, New Britain, Conn., a corporation of Connecticut Application December 20, 1947, Serial No. 792,976

2 Claims. (Cl. 29—59)

My invention relates to automatic stock-feeding mechanisms, and in particular to such mechanisms as are adapted to feeding bar or the like stock to the spindle of a lathe-type machine.

It is an object of the invention to provide an improved mechanism of the character indicated.

It is another object to provide improved stock-feeding mechanism that will permit more efficient consumption of stock.

It is also an object to provide an improved means for supporting the feeding end of a piece of stock being fed into a machine of the character indicated.

It is a further object to provide an improved means for supporting stock in a stock-feeding mechanism, both while the rear or unused end of the stock is over the frame of the stock-feeding mechanism and while said end is within the machine that is being fed.

It is a specific object to provide an improved stock-feeding mechanism that may be adapted to the internal feeding of a lathe spindle and that will feed stock as far as the rear end of the chuck or collet jaws.

Other objects and various further features of the invention will be pointed out or will occur to those skilled in the art from a reading of the following specification in conjunction with the accompanying drawings. In said drawings, which show, for illustrative purposes only, a preferred form of the invention:

Fig. 1 is a side view of a stock-feeding mechanism according to the invention, shown in assembled relation with a lathe-type machine to be supplied by said mechanism;

Fig. 2 is an enlarged partly broken-away fragmentary view showing elements of the stock-feed mechanism of Fig. 1; and Fig. 3 is a sectional view taken substantially in the plane 3—3 of Fig. 2.

Briefly stated, my invention contemplates a stock-feeding mechanism which may provide improved support for the rear or fed end of the stock, not only while the stock is relatively long and projecting rearwardly of the machine being fed, but also while the stock is relatively short and completely within said machine. The stock-feeding mechanism may include longitudinally extending guide means for a movable support or carriage, and longitudinally extending pusher means is longitudinally movable with respect to and supported by the supporting carriage. Feed means are provided for the pusher means. At the beginning of its travel, and while the stock is relatively long, the supporting carriage is preferably at the forward end of the pusher means, so as to provide aligning, whip-resisting support for the rear end of the stock. After reaching the end of travel of the supporting carriage, the stock is relatively short and may be supported with adequate alignment while the pusher means is extended with respect to the carriage and even while the pusher means is within the spindle of the machine being fed.

Referring to the drawings, my invention is shown in application to a stock-feeding mechanism for supplying bar or tubular stock 5 through the hollow spindle 6 of a lathe-type machine 7. The spindle 6 carries a collet or chuck 8 at the forward end, for grasping the stock 5 in position for cutting operations by tools (not shown). A stock stop 9 is shown in position to arrest the feed of the stock 5. The frame of the machine 7 is shown to include a housing 10 for its operating mechanism, and the body of the spindle 6 happens only to extend rearwardly a fraction of the length of the housing 10.

In accordance with the invention, I provide an extensible stock-feeding mechanism including a pusher member 11 that may be extended beyond the stock-feed frame 12 into the rear of the machine housing 10 and preferably within the spindle 6, up to the rear end of the chuck or collet jaws. The mechanism may include longitudinally extending ways or guides in the form of channel rails 13—14 upon which a forward carriage 15 is movably guided. The pusher member 11 is preferably longitudinally movable with respect to the forward carriage 15 so that the pusher 11 may be extended after the forward carriage 15 has reached the limit of its travel on rails 13—14. Feed means may be applied to the pusher 11, preferably rearwardly of the forward carriage 15.

In the form shown, the feed means for the pusher 11 includes a second support or carriage member 16, which may be locked by clamp screws 17 against axial movement with respect to pusher 11, and which may be guided by rails 13—14 for longitudinal motion. Both carriages 15—16 may be of similar construction, and, in the form shown, in order to permit a sliding fit between pusher member 11 and the forward carriage 15, clamping screws 18 may be locked in opposition to the screws 19, thereby fixing a selected looseness of fit between members 11—15, as will be clear. Both carriages 15—16 may travel on the rails 13—14 by means of a system of rollers which may assure lateral as well as longitudinal stability. Thus, rollers 20—21 may sustain the main carriage load, while side rollers 22 and bottom rollers 23 may prevent carriage misalignment and possible jumping.

As indicated, feed forces are preferably applied to the pusher bar 11 rearwardly of the forward carriage 15, so that pusher extension may proceed without changing the point of application of feed forces. In the forms shown, a cable-drive system is employed for feeding. Thus, a cable 24 may be tied to the pusher member 11 by way of a feed pin 25 on the carriage 16, and a system of pulleys 26—27—28 may guide the cable 24 to a pneumatic actuating system 29. Since the lathe machine 7 is shown to include a stock stop 9, the compressed air to the pneumatic system 29 may be constantly applied, so that feed forces may be constantly delivered to the rear carriage 16 and hence to the stock 5. A feeding operation is then automatically achieved when the collet or chuck 8 is opened, to permit a new length of stock 5 to feed out to the stock stop 9. Upon closing the collet 8, the stock stop 9 may be automatically retracted.

In the form shown, the pusher means 11 may not only be locked by clamp screws 17 against axial motion with respect to carriage 16, but it is also locked against rotation since it is shown to be a single bar. The nose 30 at the forward end of the pusher means 11 must, therefore, be rotatable in order to follow rotation of the stock 5, which rotates with the spindle 6. The revoluble suspension for nose 30 preferably includes antifriction bearing means, and in the form shown opposed tapered roller bearings 31—32 are set to sustain substantial longitudinal thrusting forces. Although the stock 5 is shown to be tubular, with a conical nose 30 to engage and support the same, it will be clear that if solid bar stock were to be fed, the nose 30 on pusher means 11 could be suitably recessed and supported by bearing means similar to the bearing means 31—32 shown. In any case, in order to feed even when the stock 5 is shorter than the spindle 6, the dimensions of the pusher nose should be such as to clear the inner dimensions of the spindle.

In operation, the forward carriage 15 is preferably held as near as possible to the point of support of stock 5, for substantially the full travel along guide rails 13—14. This relative positioning may be effected by latch means 33, which is shown in the form of a spring catch carried by a fixed flange 34 on the pusher rod 11 and extending into resilient engagement with a lug or other projection 35 on the carriage 15. When the stock 5 has been consumed to such a point that the forward carriage 15 reaches the end of its travel, the carriage 15 will abut a stop, such as the stop 36 at the forward end of frame 12. It will be appreciated that further feeding thrust, as applied to bar 11 through the rear carriage 16, may serve to disable the latch 33 to that pusher means 11 may extend beyond its normal relationship with the forward carriage 15. Fig. 1 shows this relationship when the pusher nose 30 has been extended part way into the rear of the machine housing 10, and it will be understood that further feeding is possible through the rear end of the spindle 6.

In setting up my stock-feed mechanism to feed a new piece of stock, a maximum length of stock 5 may be accommodated by releasing the clamp screws 17 and by then extending the pusher means 11 behind the rear end of the rear carriage 16 (while the carriage 16 is at the rear end of track 14). This rearward extension is, of course, possible until carriages 15—16 abut each other, with the flange 34 in abutment with carriage 15. The new stock may then be laid ahead of the nose pusher 30, and loaded into the spindle 6 and chucked. Thereafter, the pusher means 11 should be extended until the nose 30 supports the rear end of stock 5, with the rear carriage 16 as far back as possible. The screws 17 should be set so as to clamp the rear carriage 16 for a feeding operation, and the forward carriage 15 should be latched to the flange 34 on the pusher means. The mechanism is then set up for a repetition of the described feeding cycle.

It will be seen that I have described a relatively simple mechanism for more effectively feeding stock into a machine of the character indicated, and for properly supporting the stock at all times so as to resist whipping or other misalignment effects. My mechanism permits accommodation of maximum lengths of stock for a given length of stock-feed track, and in any case the stock may be consumed to the fullest extent permitted by the machine which is being fed.

While I have described my invention in detail for the preferred form shown, it will be understood that modifications may be made within the scope of the invention as defined in the appended claims.

I claim:

1. A stock-feeding mechanism, comprising fixed elongated guide means, an elongated stock pusher including elongated guide means extending a feed length along said pusher, said pusher guide means having a uniform elongated length, front and rear carriages mounted for movement along and guided by said fixed elongated guide means, said carriages including guide means conforming to said pusher guide means, said carriage guide means being aligned and extending longitudinally with respect to said fixed elongated guide means, said several guide means being so constructed and arranged that said pusher may be longitudinally guided for said feed length in both said carriages and relatively to each of said carriages, detachable connecting means cooperating between each of said carriages and said pusher for selectively connecting either or each of said carriages against longitudinal displacement with respect to said pusher, whereby upon loading a piece of stock in said feed mechanism for feeding stock beyond the front end of said elongated guide means, both of said carriages can be moved along said fixed elongated guide means into adjacency at the rear end thereof and said pusher may be moved rearwardly of said adjacent carriages so that the feed length extends rearwardly of said rear carriage for accommodating maximum length stock and so that during a feed movement said pusher may be first moved with respect to said rear carriage and then with respect to said front carriage.

2. A stock-feeding mechanism according to claim 1, in which the cross-section of said pusher guide means and of said carriage guide means are substantially the same.

DONALD H. MONTGOMERY.

REFERENCES CITED

The following references are of record in the file of this patent:

UNITED STATES PATENTS

| Number | Name | Date |
| --- | --- | --- |
| 324,409 | Nutting | Aug. 18, 1885 |
| 2,272,720 | Mariotte | Feb. 10, 1942 |